Oct. 6, 1970   M. BOZOIAN   3,532,981
CONSTANT CURRENT INSTRUMENT REGULATOR
Filed Jan. 15, 1968

MICHAEL BOZOIAN
INVENTOR

BY John R. Faulkner
Keith L. Gerschling
ATTORNEYS

United States Patent Office 3,532,981
Patented Oct. 6, 1970

3,532,981
CONSTANT CURRENT INSTRUMENT REGULATOR
Michael Bozoian, Ann Arbor, Mich., assignor to Ford Motor Company, Dearborn, Mich., a corporation of Delaware
Filed Jan. 15, 1968, Ser. No. 697,667
Int. Cl. G01r 5/22, 5/26
U.S. Cl. 324—106                                          1 Claim

ABSTRACT OF THE DISCLOSURE

A constant current device for an instrument regulator in which a constant current flow through a resistor thereby developing a constant voltage drop across the resistor which in turn is employed to bias a transistor to a level where a constant current will flow through it and through a heater winding of a thermal gauge for a given setting of a variable resistor which may be indicative of a value to be measured, for example, the level of fuel employed in the fuel tank of an automotive vehicle. In accordance with the invention, a field effect transistor is coupled in series with a resistance of known and easily controlled value. This constant current through the resistor develops a constant voltage which may be applied to the base of the transistor to bias it to a constant level of current flow through it and through the heater winding of a thermal gauge for a given setting of the variable resistor.

BACKGROUND OF THE INVENTION

It is current practice in certain automotive gauge systems to use a regulator of the electromechanical type which will supply a constant voltage to a thermal gauge which is operated by means of a winding positioned on a movable bimetallic member. The current through the winding is varied in accordance with a signal received from a variable resistor which is indicative of the value of a parameter to be measured, for example, the level of fuel that is present in the fuel tank of the vehicle. These regulators, as stated above, are the electromechanical type and incorporate vibrating electrical make-and-break contacts which present problems because of limited life, especially when the regulator is employed to provide a constant voltage for a number of thermal gauges.

These contacts have a limited life and are often very difficult to construct properly when they are made in large volumes on a production line that incorporates unskilled labor. As a result, the scrappage of the regulators may be unduly high and, furthermore, they may have to be replaced at certain intervals due to the wear and failure of the vibrating electromechanical make-and-break contacts.

It has been proposed in the prior art to employ solid state devices in place of the vibrating electromechanical regulator to regulate the current that may flow through the winding of the thermally operated bimetallic gauge described above. For this purpose, a Zener diode may be employed which will provide a certain value of biasing voltage for a transistor that has an output circuit that may be connected in series with this winding of the thermally responsive gauge. These devices, however, leave considerable to be desired in the way of accuracy and regulating quality. The voltage drop across the Zener diode may vary within limits of plus or minus 20% for Zener diodes that are sufficiently economical in cost to be employed in large volumes with automotive vehicles.

It has also been suggested in the prior art that a current limiting device be employed in series with the Zener diode to provide a constant current through it to thereby increase the stabilization of the Zener diode so that the voltage across it does not vary substantially due to current flow. This type of device, however, still suffers from the disadvantage that Zener diodes with very accurately controlled voltage drops in relation to current must be employed in order to obtain a current flow through a transistor and a thermally responsive gauge positioned in series with it to obtain proper and accurate readings of the gauge in accordance with the parameter to be measured. In order for the voltage drops across the Zener diodes to be accurately controlled, the Zener diodes must be of the very expensive type in which the voltage drops across them have been accurately controlled by expensive manufacturing techniques or in which Zener diodes with certain constant voltage drops across them have been selected on a statistical basis from a large group of Zener diodes that have been manufactured in accordance with economical manufacturing procedures. Even if a very selective process is employed which would prove uneconomical for use in a gauging system of an automotive vehicle, the tolerances which are inherent in Zener diodes is sufficiently great that they will fail to provide the necessary accuracy for use in a thermally responsive gauge for an automotive vehicle gauging system.

It should be noted that there is no way once a Zener diode has been manufactured to adjust the voltage drop that occurs across it when it is placed in a circuit configuration.

SUMMARY OF THE INVENTION

The present invention provides a current regulator and a current regulator in combination with a thermally operated gauge for an automotive vehicle which will provide a regulated current through the heater wire of a thermally responsive gauge within sufficiently accurate limits so that the regulator may be employed with an automotive vehicle gauging system. In accordance with the invention, this may be done very economically and without complex and difficult manufacturing procedures. Furthermore, the regulator of the invention may be readily adapted to be produced by integrated circuit techniques which would lower its cost to the point where it may be economically employed with the gauging systems of automotive vehicles.

In accordance with the invention, a field effect transistor with a gate coupled to the sink electrode is positioned in series with a resistor which can have thermal characteristics matched to the thermal characteristics of the heater wire of the thermally responsive gauge. This series circuit is positioned across the source of electrical energy of the automotive vehicle, for example, an electrical storage battery in which the output or terminal voltage may vary over wide limits depending upon the mode of operation of the automotive vehicle and the condition of the electrical storage battery. This arrangement provides a constant current through the resistor despite wide variations in the terminal or output voltage of the electrical storage battery.

A constant voltage drop may, therefore, be generated across the resistor and this voltage drop may be applied to the base of an output transistor coupled in series with the heater wire of the thermally responsive gauge.

Such a regulator may then be employed with a thermally responsive gauge to produce a constant current through the heater wire of the gauge when a variable resistor which is employed to measure a given parameter in an automotive vehicle, for example, the fuel level in the fuel tank of the vehicle has a given value. Various ways of connecting the gauge to the regulator will be described subsequently in the specification.

DESCRIPTION OF THE PREFERRED EMBODIMENT

Figure 1:
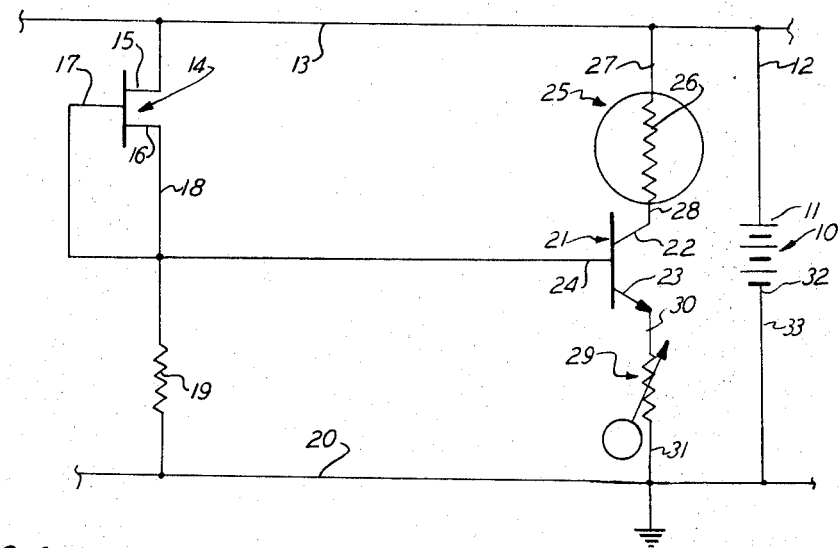
FIG. 1 discloses the constant current regulator of the present invention.

Referring now to the drawings in which like reference numerals designate like parts in the two views described above, there is shown in FIG. 1 the constant current regulator of the present invention. An electrical storage battery 10 has a terminal, for example, a positive terminal 11 having a lead 12 connected thereto, and this lead is connected to a line 13. The line 13 is connected to a current limiting device in the form of a field effect transistor 14 having a drain 15 in the form of an output electrode connected to the line 13. The other output electrode of the field effect transistor 14 in the form of a sink 16 is connected to a lead 18 that in turn is connected with the gate electrode 17 of the field effect transistor 14. The junction formed by the connection of the lead 18 connected to the sink 16 and the lead from the gate 17 is connected to one terminal of a resistor 19, the resistance of which has a constant value. The other terminal of the resistor 19 is connected to another line 20 which in turn may be connected to ground as shown in FIG. 1.

As can be seen by reference to FIG. 1, the present invention includes an output transistor 21 which has a collector 22, an emitter 23 and a base 24. The junction of the lead 18, the one terminal of the resistor 19 and the gate 17 is connected to the base 24 of the output transistor 21.

A thermally responsive gauge, generally designated by the numeral 25, is provided with a heater winding 26 having one terminal connected to the lead 13 through a lead 27, while the other terminal of the heater winding 26 is connected to the collector 22 of the transistor 21 through a lead 28. The thermally responsive gauge 25 may be any of those which are known in the prior art and which are currently employed in automotive vehicles. An example of such a thermally responsive gauge is shown in U.S. Pat. 2,520,899, issued Aug. 29, 1950 to T. J. Smulski in which a heater winding is employed to cause a deflection of a bimetallic member. The deflection of the bimetallic member is in turn employed to cause deflection of a pointer that indicates the value of a parameter to be measured. The emitter 23 of the transistor 21 is connected to one terminal of a variable resistor 29, the resistance of which may be varied in accordance with a parameter to be measured, for example, the fuel level in a fuel tank of an automotive vehicle. The other terminal of the variable resistor 29 may be connected to ground and, hence, to the lead 20 through a lead 31.

As shown in the drawing of FIG. 1, the lead 31 is connected to ground and, hence, to the lead 20. The lead 20 in turn is connected to the other terminal 32 of the source of electrical energy in the form of the storage battery 10 through a lead 33. This terminal 32 may be the negative terminal of the electrical storage battery 10.

In the operation of the constant current regulator shown in FIG. 1, the terminal voltage of the source of electrical energy 10, which may be in the form of an electrical storage battery in an automotive vehicle, may vary over wide limits. For example, during the starting of an automotive vehicle, the terminal voltage of the electrical storage battery 10 may drop to a value as low as 6 volts while during a normal operation of the automotive vehicle in which the electrical storage battery 10 is connected to an electrical generator, the terminal voltage appearing across the terminals of the electrical storage battery 10 may be in the vicinity of 14 volts. It is necessary, therefore, that the current through the heater winding 26 of the thermal gauge 25 be regulated to provide a substantially constant current therethrough irrespective of the terminal voltage appearing at the terminals of the electrical storage battery 10 for any given value of the variable resistor 29. This has been accomplished in the present invention by means of a simple, uncomplicated and inexpensive device including the field effect transistor 14, the constant valued resistor 19 and the output transistor 21 which will provide a substantially constant current through the heater winding 26 for any given value of the variable resistor 29, irrespective of the terminal voltage of the electrical storage battery 10.

As can be seen by reference to FIG. 1, the one output electrode in the form of the sink 16 is connected to the gate electrode 17 and to one terminal of the constant valued resistor 19. With this arrangement of the field effect transistor 14, a substantially constant current will flow through the output electrodes in the form of the drain 15 and the sink 16 irrespective of wide variations in the terminal voltage of the battery 10. As a result, a substantially constant current will flow through the fixed valued resistor 19 thereby providing a substantially constant voltage drop across the fixed valued resistor 19 to thereby provide a substantially constant voltage on the base 24 of the transistor 21. It can be seen, therefore, that for a given value of the variable resistor 29, which as stated before may be varied in accordance with a parameter to be measured, for example, the fuel level in a fuel tank of an automotive vehicle, a substantially constant current will flow through the transistor, that is, from the collector 22 through the emitter 23. As a result, a substantially constant current will flow through the heater winding 26 of the thermal gauge 25 thereby providing a constant reading for any given value of the parameter to be measured irrespective of wide variations in the terminal voltage of the source of electrical energy or storage battery 10.

Figure 2:
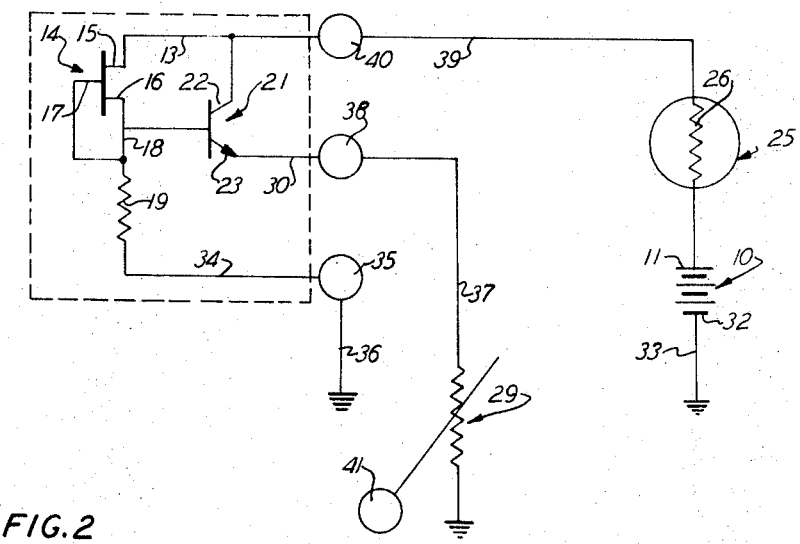
FIG. 2 discloses a gauge in an automotive vehicle that employs the constant current regulator disclosed in FIG. 1.

FIG. 2 of the drawing discloses a means for connecting the constant current regulator of FIG. 1 in a modern day automotive vehicle. The variable resistor 29 is positioned in the fuel tank of the automotive vehicle where it is suitably connected to a float 41 so that its value may be varied in accordance with the fuel level in the fuel tank. In this arrangement the source of electrical energy 10 is connected in series with the heater winding 26 of the thermally responsive gauge 25. The terminal of the heater winding 26 that is not connected to the source of electrical energy 10 is connected to a junction 40 through a lead 39 and the junction 40 in turn is connected to the line or lead 13, as shown in FIG. 1. The variable resistor 29, as shown in FIG. 2, has one terminal connected to ground and the other terminal connected through a lead 37 to a juction 38 that in turn is connected to the lead 30 and, hence, to the emitter 23 of the transistor 21. On the other hand, the lead or line 20, in FIG. 1, is represented in FIG. 2 by the numeral 34 and it is connected to a junction 35 that in turn is connected to ground through a lead 36.

The operation of the circuit shown in FIG. 2 is the same as the operation of the circuit shown in FIG. 1 and a constant current will flow from the source of electrical energy 10 through the heater winding 26 of the thermally responsive gauge 25 irrespective of the terminal voltage of the source of electrical energy 10 for any given value of the variable resistor 29 as determined by the position of the float 41.

It has been found that the above described constant current regulator and gauging system provides very satisfactory performance in a gauging system of an automotive vehicle. For example, with a given setting of the variable resistor 29, the current through the heater winding 26 of the thermally responsive gauge 25 varied only two milliamperes when the terminal voltage of the source of electrical energy 10 varied over 8 volts. For example, with a terminal voltage of the source of electrical energy 10 at 11 volts, 124 milliamperes of current was measured in the heater winding 26 of the thermally responsive gauge 25 while with a terminal voltage of 19 volts at the source of electrical energy 10, 126 milliamperes of current was measured in the heater winding 26 of the thermally responsive gauge 25. The above cited figures disclose that very satisfactory current regulation through the heater winding 26 of the thermal responsive gauge 25 may be achieved.

Furthermore, the variation of the resistance of the fixed resistor 19 as a function of temperature may be matched to the variation in the resistance of the heater winding 26 of the thermally responsive gauge 25 in a very satisfactory manner.

The above described current regulator is eminently well suited to be constructed by integrated circuit techniques and the value of the fixed resistor 19 may be very closely controlled in this sort of construction to provide a very constant current flow through the heater winding 26 of the thermal gauge 25.

The invention disclosed will have many modifications which will be apparent to those skilled in the art in view of the teachings of this specification. It is intended that all modifications which fall within the true spirit and scope of this invention be included within the scope of the appended claim.

What is claimed is:

1. An electrical gauge system adapted for use in an automotive vehicle comprising a source of electrical energy the terminal voltage of which varies over wide limits, a thermally responsive gauge having an indicator means and a resistive heater means coupled to said indicator means for causing deflection of said indicator means as a function of the current through said resistive heater means, a power transistor having a pair of output electrodes and a base, a variable resistor, the resistance of which varies as a function of a value to be measured, said source of electrical energy, said output electrodes of said power transistor, said heater means and said variable resistor connected in series, a field effect transistor having a pair of output electrodes and a gate, said gate being connected to one of said output electrodes, a resistor, said output electrodes of said field effect transistor being connected in series with said resistor, said output electrodes and said resistor being connected in series with said source of electrical energy, one terminal of said resistor, said gate and one of said output electrodes of said field effect transistor being connected to form a junction, said junction being connected to the base of said power transistor to provide a constant bias on said output transistor for a given value of said variable resistor, the temperature coefficient of resistance of said last mentioned resistor being matched to the temperature coefficient of resistance of said resistive heater means whereby temperature compensation of said electrical gauge system is provided.

References Cited

UNITED STATES PATENTS

| | | | |
|---|---|---|---|
| 2,520,899 | 8/1970 | Smulski | 324—106 |
| 3,246,233 | 4/1966 | Herz | 323—22 |
| 3,303,413 | 2/1967 | Warner et al. | 323—22 |

OTHER REFERENCES

Lancaster, D. E.; "Using The New Constant Current Diodes," Electronics World, October 1967, pp. 30, 31, and 78.

Warner, Jr., et al.; "A Semiconductor Current Limiter," Proceedings of the IRE, January 1959, pp. 44 through 56.

RUDOLPH V. ROLINEC, Primary Examiner

E. F. KARLSEN, Assistant Examiner

U.S. Cl. X.R.

324—123, 105